United States Patent [19]

Schwede

[11] Patent Number: 4,548,231
[45] Date of Patent: Oct. 22, 1985

[54] PILOT-OPERATED PRESSURE-LIMITING VALVE WITH A FEEDING FUNCTION

[76] Inventor: Franz-Josef Schwede, Promenade 5, 7900 Ulm, Fed. Rep. of Germany

[21] Appl. No.: 90,326

[22] Filed: Nov. 1, 1979

[30] Foreign Application Priority Data

Jul. 11, 1978 [DE] Fed. Rep. of Germany ....... 2848208

[51] Int. Cl.$^4$ .................................................. F16K 7/10
[52] U.S. Cl. .................................. 137/491; 137/492.5; 137/493
[58] Field of Search ............ 137/489, 491, 492, 492.5, 137/493

[56] References Cited

U.S. PATENT DOCUMENTS

| 3,100,503 | 8/1963 | Tennis | 137/491 |
| 3,164,166 | 1/1965 | Tennis | 137/493 X |
| 4,013,093 | 3/1977 | Pensa | 137/493 X |

*Primary Examiner*—Alan Cohan
*Attorney, Agent, or Firm*—Michael J. Striker

[57] ABSTRACT

A pilot-controlled pressure limiting valve with a feeding function for pressure medium to be replenished comprises a main control spool movable between a pressure chamber and a high pressure inlet and being formed with a control edge to control communication between the inlet and a low pressure outlet; an annular piston slidably surrounds the main spool and in the closing position of the spool rests on a stationary abutment in the range of the low pressure outlet; the other face of the annular piston cooperates with a stop flange on the main spool so that when pressure medium is fed into the low pressure outlet the annular piston engages the stop flange and moves the main spool in opening direction so as to establish communication between the outlet and the inlet.

1 Claim, 2 Drawing Figures

PILOT-OPERATED PRESSURE-LIMITING VALVE WITH A FEEDING FUNCTION

BACKGROUND OF THE INVENTION

The invention relates to a pilot-operated pressure-limiting valve with a feeding function wherein a main control spool, when in its pressure limiting function, is acted upon by operating medium flowing in its opening direction and when in its feeding function, is acted upon by pressure medium flowing in a direction transverse to the opening direction. Such pressure-limiting valves are installed in the known manner within closed hydraulic circuits, wherein the feed-in of operating medium or hydraulic liquid, is implemented at the low-pressure side by a feed pump and through the pressure-limiting valve. Feeding will ensue herein against the direction of flow prevailing during pressure-limiting operation.

In pressure-limiting operation, the operating medium will impinge upon the face of the main control spool which is constructed as a support in the opening direction of its movement, while during feeding operation, the operating medium will laterally impinge upon the main control spool. In order to allow opening of the main control spool by the operating medium being fed in, it must be provided with an annular area to be impinged upon by the operating medium flowing in the opening direction of the main control spool. This additional annular area will increase the effective area of the main control spool available for acting in the closing direction. In consequence thereof, the main control spool will, during pressure-limiting operation, not open simultaneously with the pilot valve. For the main control spool to open, the pressure before the main control spool must be higher, by a differential corresponding to the annular area, than the pressure acting in the closing direction and holding the pilot valve in the open position. This preliminary opening of the pilot valve relative to the main control spool will cause a loss of efficiency in the hydraulic drive. This loss in efficiency will be particularly large when the hydraulic drive operates for a longer period within the pressure range that causes preliminary opening of the pilot valve.

In order to avoid such uneconomical operation of a pressure-limiting valve with a feeding function, it has already been proposed in DT published patent application No. 26 31 922, to have the main control spool laterally impinged by high pressure, and to have the low pressure act against the face, i.e. in the direction of opening of the main control spool. Therein, the pilot cone is provided with a piston-shaped extension in order to form an area upon which pressure can act to effect opening of the pilot valve. This extension is located within an axial bore of the main control spool, the axial bore being connected to a lateral bore, the extension thus forming, conjointly with the axial bore, the requisite restrictor point before the control space of the main control spool.

In such a construction of the pressure-limiting valve with feeding it, is of the essential disadvantage that no precisely definable shape can be achieved for the restriction between the piston-shaped extension of the pilot cone and the bore of the main control spool, so that fluctuations will thus be caused in the intermediate range which, finally, will cause system-pressure fluctuations. Furthermore, such an annular-gap restrictor will lead to the preset pressure becoming temperature-sensitive. Finally, unavoidable friction of the piston-shaped extension within the bore of the main control spool will impair a constant pressure level. A further deficiency results from lateral impingement of the operating medium upon the main control spool during pressure-limiting operation, i.e. on account of a negative attenuating length at the main control spool which, during certain operating conditions, will cause instability, i.e. fluttering, of the main control spool. A further disadvantage may also be seen in the fact that it is not possible to conduct the relieved high-pressure oil within the valve to the low-pressure side. It is, on the contrary, necessary to provide additional return passages within the base plate for the pressure-limiting valve, valve usually being constructed as insertable cartridge.

SUMMARY OF THE INVENTION

An object of the invention is to avoid the aforenamed disadvantages in a pilot-operated pressure-limiting valve of this type. Another object of the invention is to provide such a valve which in its pressure-limiting function will open approximately delay-free, i.e. that the main control spool will open approximately simultaneous with opening of the pilot valve, so that economical operation of the pressure-limiting valve is ensured.

In keeping with these objects and others which will become apparent hereafter, one feature of the invention resides, in a valve of the aforedescribed type, in the provision of housing means defining a control chamber, a high pressure inlet, a low pressure outlet and an abutment step in the range of the outlet the main control spool being movable in two opposite directions between the control space and the high pressure inlet, one end of the spool cooperating with the inlet to control communication between the inlet and the outlet while the other end of the spool facing the control chamber being provided with a stop element; and an annular piston slidably surrounding the main spool between the control chamber and the abutment step to engage the stop element and move the main spool in the opening direction when pressure in the outlet exceeds the pressure in the control chamber.

The novel features which are considered as characteristic for the invention are set forth in the appended claims. The invention itself, however, both as to its construction and its method of operation, together with additional objects and advantages thereof will be best understood from the following description of specific embodiments when read in connection with the accompanying drawing.

DESCRIPTION OF THE PREFERRED EMBODIMENT

Figure 1:
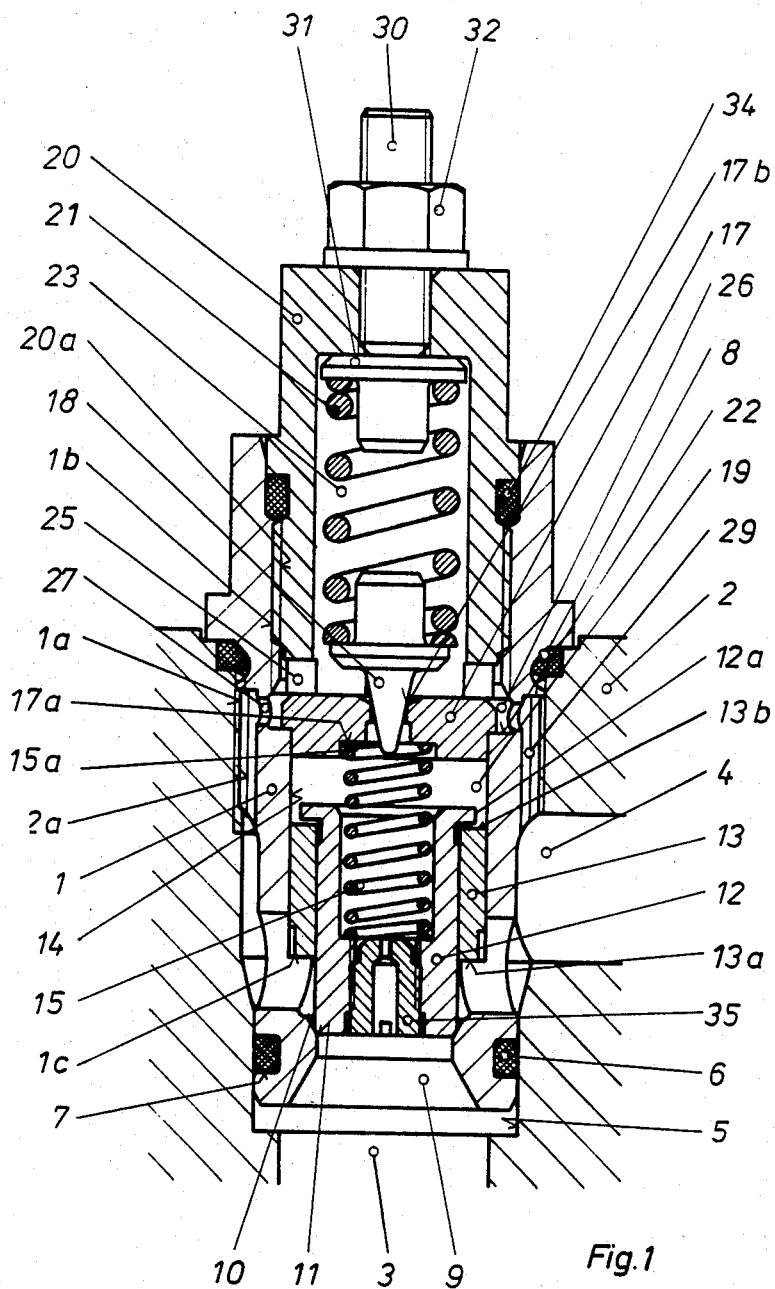
FIG. 1 represents an axial section of the pilot-operated pressure-limiting valve with a feeding function.

In FIG. 1, numeral 1 denotes the valve housing inserted within a control block 2. The control block 2 is provided with the inlet or high-pressure side 3, and the outlet or low-pressure side 4. The valve housing 1 is inserted into a recess 5 of control block 2, with a surrounding gasket 6 set into a surrounding groove 7 of the valve housing serving within the housing for a fluid-tight separation of inlet side 3 and outlet 4.

Above the outlet 4, there is provided within the housing an outer thread 1a screwed into an inner thread 2a in the control block 2. The threaded connection between valve housing 1 and recess 5 within control block 2 is sealed fluid-tight toward the exterior by means of the gasket 8. Within inlet zone 9, valve housing 1 is provided with an inclined seat area 10 to accommodate seat edge 11 of main control spool 12. The main control spool 12 is of cylindrical construction without any differential areas, and is surrounded by annular piston 13 which in turn is guided within guide bore 14 of valve housing 1. The annular spool 13 and the main control spool 12 are slidingly interconnected.

In the direction toward the housing seat surface 10, the main control spool is loaded by a weak compression spring 15, with the end 15a of which resting against the wall 17a of an intermediate disc 17.

The intermediate disc 17 is formed with valve seat 17b for the pilot cone 18 and delimits the control space 19 for the main control spool. The disc is pressed by spring housing 20, enabling compression spring 21 of pilot cone 18, against the abutting surface 22 of valve housing 1, in such a manner that a seal is formed thereby. The spring space 23, delimited by the spring housing 20, is connected by radial recess 25 in the spring housing with a continuous annular space 26 between intermediate plate 17 and valve housing 1, this space 26 in turn being connected through radially oriented recesses 27 to axially oriented connecting bores 29 in the housing 1, and the bores 29 being connected to the outlet, or low-pressure side 4 of control block 2. The possibility thus exists that, with the pilot cone 18 open, the operating medium flowing from valve space 19 into spring space 23 may be supplied therefrom directly to the low pressure side 4. No additional drain will thus be required for the operating medium flowing from control space 19 to spring space 25 when the pilot cone 18 is open. Setting of the pre-tension of compression spring 21 for pilot cone 18 is made by means of adjusting screw 30 which is in frictional contact with spring plate 31 and which is secured by lock nut 32 against unintentional movement. The spring housing 20 is provided with an outer thread 20a, engaging an inner thread 1b within housing 1. The gap between housing 1 and spring housing 20 is sealed toward the exterior by means of a seal ring 34. The valve housing 1 thus integrates into a single structural unit, suitable for installation in the control block 2, the main control spool forming the main valve conjointly with valve seat 10, as well as the pilot cone 18 constituting the pilot valve together with the valve-seat surface 17b of intermediate disc 17. A nozzle insert 35 is axially threaded into main control spool 12, for connecting the inlet side 3 of valve housing 1 with control space 19.

If the operating-medium pressure prevailing at housing inlet 9 and within control space 19 exceeds the pressure set at pilot cone 18 by means of compression spring 21, pilot-cone 18 will lift away from valve seat-surface 17b against the force of compression spring 21, thus connecting space 19 with spring space 23, so that the control operating medium flowing through nozzle insert 35 into control space 19 may continue to flow through spring space 23, recesses 25, annular space 26, radial recesses 27 and axial connecting bores 29 to the low-pressure side 4.

Thus, it is only the control pressure set at the pilot cone 18 that will prevail within control space 19. Upon a small rise in the inlet-side pressure against weak force of spring 15, main control spool 12 will lift away from valve seat 10 thus establishing a connection from inlet side 3 to outlet side 4, so that the operating medium may flow through this connection from the high-pressure side to the low pressure side. The annular piston 13 will remain in its initial position as shown, since the control pressure, prevailing within control space 19 and acting upon face area 13b of the annular piston 13 in the direction against the inlet 3 is higher than the low pressure prevailing at the low-pressure side 4 and acting in the opposite direction upon the face area 13a of the annular piston.

When the pressure-reducing valve operates as feed valve, the pressure prevailing at its low-pressure side 4 will be higher than that at the high-pressure side 3. Thus, a higher pressure will act upon face area 13a of annular piston 13 than the pressure acting upon the face area 13b located within the control space 19, so that the annular piston 13 is displaced in the direction toward control space 19, engaging with its face area 13 the stop flange 13b of the main control spool whereby the latter is displaced against the weak force of biasing spring 15, so that the high-pressure and low-pressure sides 3 and 4 are connected, and operating medium is fed into the circuit.

In the closing position of the main control spool 12, the annular piston 13 rests against the abutting surfaces 1c in the housing 1. The distance of these abutting flange surfaces 1c to the abutting surface 12a of the main control spool 12 when the latter is in closed position, is slightly larger than the axial extent of annular piston 13. It is ensured thereby that the main control spool 12 will reach its closed position. The main control spool 12 is of cylindrical construction without any differential areas, so that the internal diameter of the annular piston 13 for controlling the main control spool will approximately be equal to the seat or outer diameter of the main control spool 12. With the pilot cone 18 closed, equal pressure will thus act upon both end face areas of the main control spool 12. Consequently, the main control spool 12 is held in its closed position merely by the small force of compression spring 15. As soon as the pilot cone 18 opens when the preset pressure has been reached, the rising pressure will cause a pressure differential at the main control spool 12, acting in the opening direction of the spool, and this pressure differential, after having overcome the small force of spring 15 will displace the main control spool in the opening direction.

When the pilot cone opens, the main control spool 12 will also open in a practically simulatneous manner, so that there will be no control fluid loss at the pressure-limiting valve that would impair the economical operation of the hydraulic installation.

Figure 2:
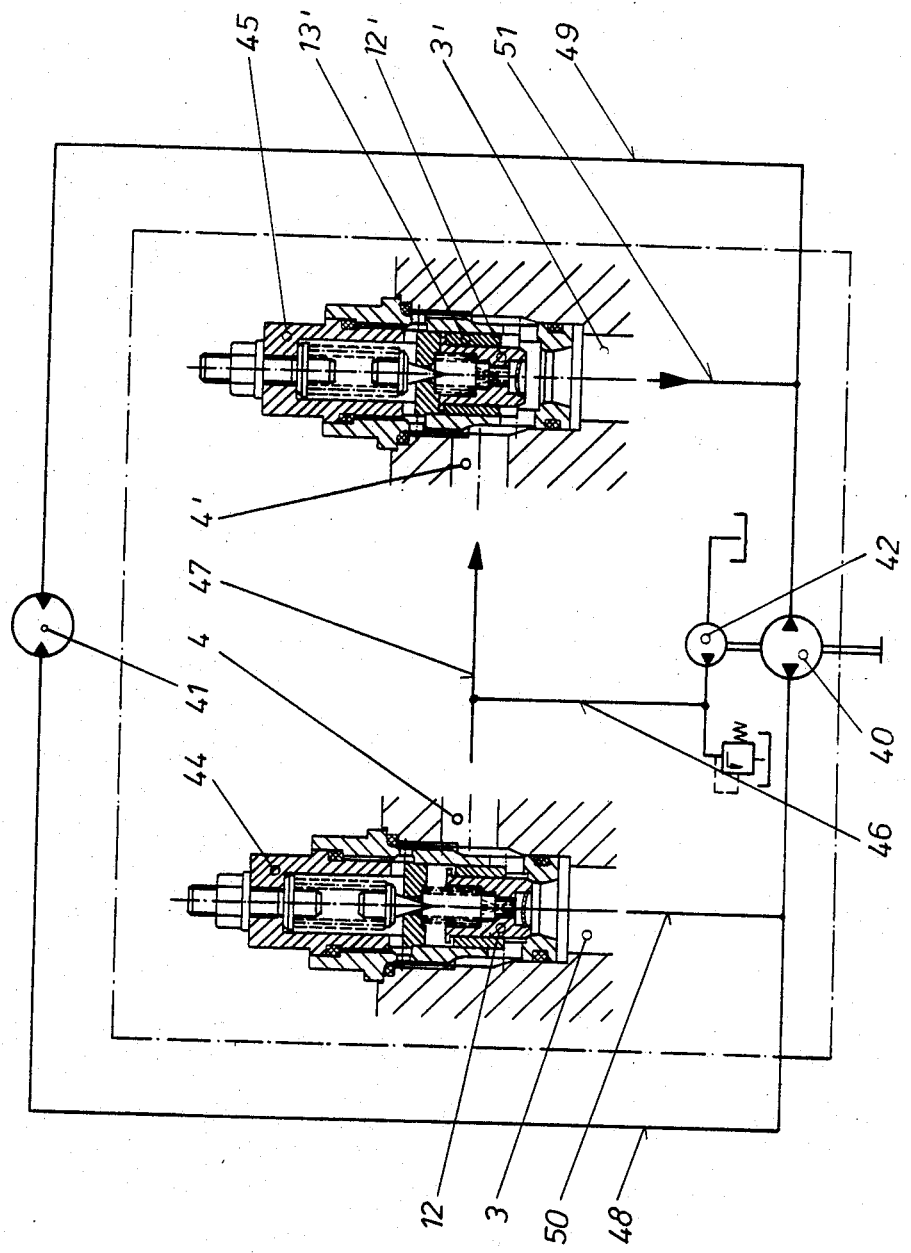
FIG. 2 represents a schematic view of the installation of such pressure-limiting valve within a closed hydraulic circuit.

In the hydrostatic drive shown in FIG. 2, consisting of pump 40 and motor 41 and working in both rotational directions, the pump 40 is also coupled to a feed pump 42. Two pressure-limiting valves 44 and 45 as shown in FIG. 1, are provided within this circuit wherein pressure lines 46, 47 are leading from the feed pump 42 to, respectively, the low-pressure sides 4 and 4' of the pressure-limiting valves 44 and 45. The high-pressure side 3 of pressure-limiting valve 44 is connected through line 50 with the line section 48 of the drive, and the high-pressure side 3' of pressure-limiting valve 45 through line 51 with the other line section 49 of the hydraulic drive.

Assuming that pump 40 will deliver through line section 48 of the drive in the direction of hydraulic motor 41, this section 48 of the drive forms the high-pressure side of the hydrostatic drive and line section 49 of the drive wherein the operating medium flows from the hydraulic motor 41 back to pump 40, forms the low-pressure side. Since losses due to leaking will occur within hydraulic motor 41 and pump 40, such losses requiring continual replenishment, the lacking operating fluid is supplied by the feed pump 42 through the pressure-limiting valve 45. The main control spool 12' will, herein, be displaced by the annular piston 13' into the open position.

In the event that the pressure at the high-pressure side exceeds the preset pressure at pressure-limiting valve 44, the main control spool 12 of pressure-limiting valve 44 will open, and the operating fluid may be delivered through the simultaneously opened pressure-limiting valve 45 from the high-pressure side directly to the low-pressure side 4. Thus, no operating medium will be lost by the closed circuit. The same results are obtained for the control fluid relieved by the pilot cone 18, as this fluid is likewise delivered to the low-pressure side.

The same conditions will result when changing the rotational direction of pump 40 whereby the section 49 of the drive becomes the high-pressure side and section 48 of the drive the low-pressure side. In this instance, feed will ensue through the pressure-limiting valve 44 and relief upon exceeding the preset pressure will be effected through pressure-limiting valve 45.

What is claimed as new and desired to be protected by Letters Patent is set forth in the appended claims:

1. A pilot-controlled pressure limiting valve with a feeding function, comprising a housing bounding a control pressure chamber; a high pressure inlet formed with a seat in communication with the pressure chamber; a main spool movable in two opposite directions between the pressure chamber and the seat and having a throttle between the high pressure inlet and the pressure chamber; a low pressure outlet formed in the housing transversely to the path of movement of the main spool; a stationary abutment provided in said housing in the range of the outlet; one end of said main spool cooperating with said seat to control communication between said inlet and said outlet and the other end of said spool facing said pressure chamber being provided with stop means; an annular piston slidably surrounding said main spool between said pressure chamber and said abutment, said annular piston being engageable with said stop means on said spool to displace the same from said seat surface when pressure of working medium in said outlet exceeds pressure of working medium in said pressure chamber, and wherein during the closing position of the main spool the clearance between the stationary abutment in the housing and the stop means on the main control spool slightly exceeds the axial length of said annular piston.

* * * * *